(12) United States Patent
Andre et al.

(10) Patent No.: US 12,197,531 B2
(45) Date of Patent: Jan. 14, 2025

(54) METHOD FOR DETERMINING A LOCAL MECHANICAL STRAIN OF A RUNNER

(71) Applicant: GE Renewable Technologies, Grenoble (FR)

(72) Inventors: Francois Andre, Grenoble (FR); Renaud Guillaume, Grenoble (FR); Florian Duparchy, Grenoble (FR); Pierre-Yves Lowys, Grenoble (FR)

(73) Assignee: GE Renewable Technologies, Grenoble (FR)

( * ) Notice: Subject to any disclaimer, the term of this patent is extended or adjusted under 35 U.S.C. 154(b) by 673 days.

(21) Appl. No.: 17/441,311

(22) PCT Filed: Mar. 16, 2020

(86) PCT No.: PCT/EP2020/057142
§ 371 (c)(1),
(2) Date: Sep. 21, 2021

(87) PCT Pub. No.: WO2020/193258
PCT Pub. Date: Oct. 1, 2020

(65) Prior Publication Data
US 2022/0147594 A1 May 12, 2022

(30) Foreign Application Priority Data

Mar. 22, 2019 (EP) .................................... 19305362

(51) Int. Cl.
*G06F 17/15* (2006.01)
*G01M 5/00* (2006.01)
(Continued)

(52) U.S. Cl.
CPC .............. *G06F 17/15* (2013.01); *G06F 30/20* (2020.01); *G01M 5/0041* (2013.01); *G06F 2111/10* (2020.01); *G06F 2119/04* (2020.01)

(58) Field of Classification Search
CPC ...... G06F 17/15; G06F 30/20; G06F 2111/10; G06F 2119/04; G01M 5/0041;
(Continued)

(56) References Cited

U.S. PATENT DOCUMENTS 6,490,506 B1 * 12/2002 March ................ G05B 23/0283
322/17
2019/0018403 A1 1/2019 Ueki

FOREIGN PATENT DOCUMENTS

CN 108590918 * 9/2018 ............ F03B 11/008
CN 108590918 A 9/2018
(Continued)

OTHER PUBLICATIONS

PCT International Search Report & Written Opinion Corresponding to PCT/EP2020/057142 on Jun. 12, 2020.

*Primary Examiner* — Alexander Satanovsky
(74) *Attorney, Agent, or Firm* — Dority & Manning, P.A.

(57) ABSTRACT

The invention concerns a method for determining a mechanical stress of a runner (40), of a hydraulic machine (10), wherein the runner is arranged to rotate around a rotation axis, wherein the hydraulic machine comprises a hydraulic channel delimited by hydraulic surfaces of the runner, the hydraulic surfaces being the surfaces against which a stream of water exerts the forces when the runner is driven in rotation by said stream of water, wherein the runner further comprises a sensor (G) on protected areas positioned away from the hydraulic channel,
the method comprises the steps of:
a) collecting a physical quantity measured by the sensor (G),
b) determining a mechanical stress on a specific location of the hydraulic surface, via a transfer function that
(Continued)

correlates the physical quantity measured in step a) and said mechanical stress on the specific location.

12 Claims, 7 Drawing Sheets

(51) Int. Cl.
    *G06F 30/20*     (2020.01)
    *G06F 111/10*     (2020.01)
    *G06F 119/04*     (2020.01)

(58) Field of Classification Search
    CPC ............. G01M 5/0016; G01M 5/0083; G01M 5/0033; Y02E 10/20
    See application file for complete search history.

(56)                 References Cited

FOREIGN PATENT DOCUMENTS

JP           H07279813   * 10/1995  ............. Y02E 10/20
JP           3756531 B2    3/2006

* cited by examiner

METHOD FOR DETERMINING A LOCAL MECHANICAL STRAIN OF A RUNNER

TECHNICAL FIELD

The present invention concerns a method for determining a mechanical strain of a runner of a hydraulic machine.

Notably, the present invention is intended to provide a method for determining a mechanical stress undergone by the runner.

PRIOR ART

When driven into rotation, for example by a stream of water, the runner of a hydraulic machine has to endure mechanical stress whose magnitude is particularly strong at specific positions, called a "hot spot", notably located at the corners of the runner blades.

The cumulative effect of this mechanical stress generates fatigue, which may ultimately trigger the initiation and the propagation of cracks (FIG. 1).

The breaking and/or the release of parts of the runner resulting from the appearance of cracks may create major damages of the hydraulic machine and cause its immobilization.

It is therefore paramount to be able to estimate the fatigue and the associated remaining lifetime of the runner.

For this purpose, it is generally proceeded to mechanical strain measurement campaigns.

In particular, said mechanical strain measurement campaigns generally involve the positioning of gauges, notably strain gauges, for example in the vicinity of hot spots, and an analysis of data collected by said gauges in order to deduce the mechanical stress undergone at the hot spot location.

However, this method is not satisfactory.

Indeed, it often requires a sequence of dewatering/rewatering of the runner to position the gauges that is cumbersome to implement.

Furthermore, this sequence and the measurement campaign immobilize the hydraulic machine under test, which is therefore not available for production. In other words, the measurement campaign generates a shortfall for the operator.

Besides, the gauges G1, which can be mounted on the suction side, on the pressure side, on the leading edge or on the trailing edge of the blades B (FIG. 2), are exposed to the stream of water circulating through the hydraulic channel, and potentially to associated vortices. The associated perturbation can lead to the release of the gauges.

In addition, depending on the duration of the mechanical strain measurement campaign, a very limited range of operating conditions can be tested.

Finally, the cost for performing such measurement campaign is quite high. It is therefore an object of the invention to propose a method for determining the mechanical stress of the runner, for example in the vicinity of hot spots, that is simpler to implement than the known prior art method.

It is also an object of the invention to propose a method for determining the mechanical stress of the runner, for example in the vicinity of hot spots, that uses sensors for which release can be prevented.

It is also an object of the invention to propose a method for determining the mechanical stress of the runner, for example in the vicinity of hot spots, over a broader range of operating conditions without affecting the availability of the hydraulic machine for production.

It is also an object of the invention to propose a method for estimating the remaining lifetime of a runner under specific operating conditions.

SUMMARY OF THE INVENTION

The aforementioned objects are, at least partly, achieved by a method for determining a mechanical stress of a runner, of a hydraulic machine, wherein the runner is arranged to rotate around a rotation axis, wherein the hydraulic machine comprises a hydraulic channel delimited by hydraulic surfaces of the runner, the hydraulic surfaces being the surfaces against which a stream of water exerts the forces when the runner is driven in rotation by said stream of water, wherein the runner further comprises at least one sensor on protected areas positioned away from the hydraulic channel, the method comprises the steps of:
a) collecting at least one physical quantity measured by the at least one sensor on protected areas,
b) determining a mechanical stress on at least one specific location of the hydraulic surface, via a transfer function that correlates the physical quantity measured in step a) and said mechanical stress on the at least one specific location.

The step b) is advantageously carried out by taking into consideration the operating conditions of the hydraulic turbine.

According to one embodiment, the transfer function is a mathematical model involving
a dynamic pressure analysis exerted by the stream of water on the runner,
and
mechanical stress analysis enabling extrapolation of a stress at the at least one specific location from a physical quantity measured by the at least one sensor.

According to one embodiment, the transfer function is determined during a learning period either on the runner or on a reduced scale model of said runner.

By "reduced scale model", it is meant a laboratory hydraulic machine and whose size or footprint is advantageously reduced with respect to the hydraulic machine.

According to one embodiment, the at least one sensor is/are permanently positioned on the runner.

By "permanently positioned" it is meant a sensor that can be left in place after mechanical strain measurement campaigns. In particular, said sensor can be left in place over long period of time, for example, over months, over years.

According to one embodiment, the at least one specific location is a location, called a "hot spot", wherein the mechanical stress corresponds to a local maximum.

By "local maximum", it is meant that it exists a region comprising the specific location so that the mechanical stress on said specific location is above the mechanical stress on any other location of said region.

According to one embodiment, the runner comprises blades, each having two opposite sides, respectively, pressure side and suction side, and extending from an external surface of a hollow hub, the pressure side and the suction side of the blades forming the hydraulic surfaces, the hollow hub further comprises an internal surface opposite to the external surface.

According to one embodiment, the at least one sensor is/are located on the inner surface of the hollow hub so that said at least one sensor are isolated from the stream of water circulating through the hydraulic channel.

According to one embodiment, the at least one sensor is/are located in cavities extending from the inner surface towards the blade, advantageously the cavities extend in the volume of the blade.

According to one embodiment, the sensor is secured on a test specimen inserted in the cavity.

By "test specimen" ("corps d'épreuve" in French, and "testkörper" in German), it is meant a support material on which a sensor is located.

In particular, the test specimen and the sensor form together a composite sensor wherein the test specimen translates the mechanical stress of interest into a mechanical strain which is finally measured by the strain gauge.

According to one embodiment, the collected physical quantity measured in step a) is/are transferred to a server.

According to one embodiment, the collected physical quantity measured in step a) is/are transferred via wirings that pass along a shaft line of the hydraulic turbine.

According to one embodiment, the collected physical quantity is/are time stamped.

According to one embodiment, parameters relating to the operating conditions are saved on the server and time stamped.

When the at least one physical quantity is a mechanical strain, then the at least one sensor comprises a strain gauge.

When the at least one physical quantity is an acceleration, a velocity or a displacement, then the at least one sensor comprises an accelerometer or a vibration sensor or a displacement sensor.

When the at least one physical quantity is pressure, then the at least one sensor comprises a proximeter.

When the at least one physical quantity is a torque fluctuation of a shaft line secured to the runner, then at least one sensor comprises a torquemeter.

This invention also concerns a method for estimating a lifetime of a runner of a hydraulic turbine over a range of operating conditions, the method comprising the determination of the mechanical stress of the runner over the range of operating conditions, and the estimation of the lifetime on the runner.

BRIEF DESCRIPTION OF THE DRAWINGS

Other characteristics and advantages shall appear in the following description of embodiments of the method for determining a mechanical strain of a runner according to the invention, given by way of non-limiting examples, in reference to the annexed drawings wherein.

DETAILED DESCRIPTION OF SPECIFIC EMBODIMENTS

The present invention concerns a method for determining the mechanical stress of a runner, of a hydraulic machine, driven in rotation.

In particular, the hydraulic machine can be used in turbine mode for electrical power generation and/or in pump mode for pumping water and/or in condenser mode.

When used in turbine mode or in pump mode, a stream of water flows through a hydraulic channel delimited by surfaces of the runner, called "hydraulic surfaces".

Therefore, the present invention concerns a method for determining the mechanical stress undergone on specific locations of the hydraulic surfaces, and notably on locations wherein the mechanical stress is a local maximum ("a hot spot").

For this purpose, the present invention proposes the implementation of at least one sensor positioned away from the hydraulic surfaces. The at least one sensor may be, for example, a strain gauge sensitive to mechanical strain undergone on said specific locations.

A transfer function is therefore used to correlate a physical quantity collected by the at least one sensor and the actual mechanical stress of the runner on the specific locations.

The invention will now be described in the context of the turbine mode. However, the skilled person, considering his general knowledge and the following description, can generalize the invention to other modes of operation of the hydraulic machine and in particular the pump and condenser modes.

Figure 1:
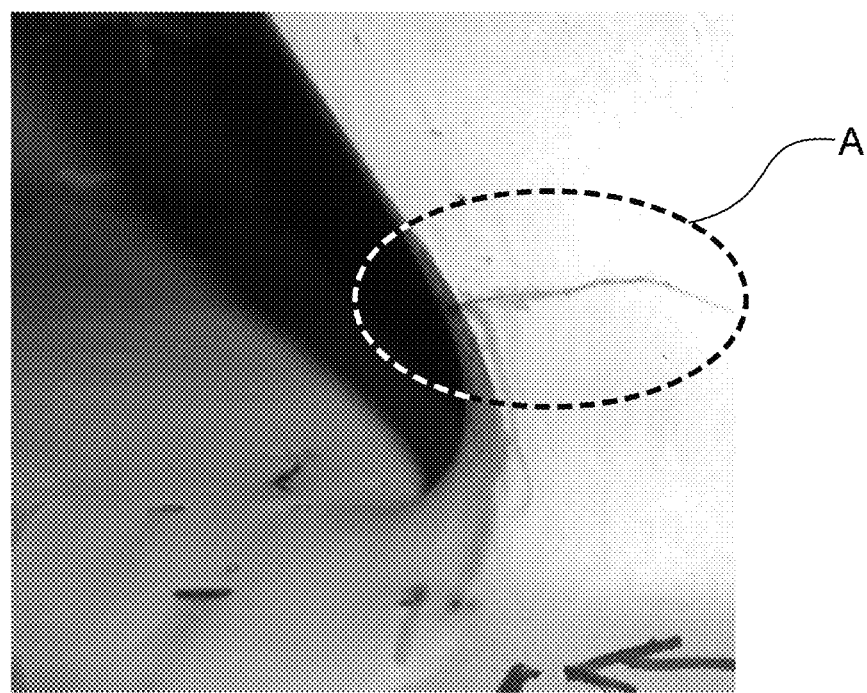
FIG. 1 represents a crack (zone labelled "A") on a corner of a blade of a runner.
Figure 2:
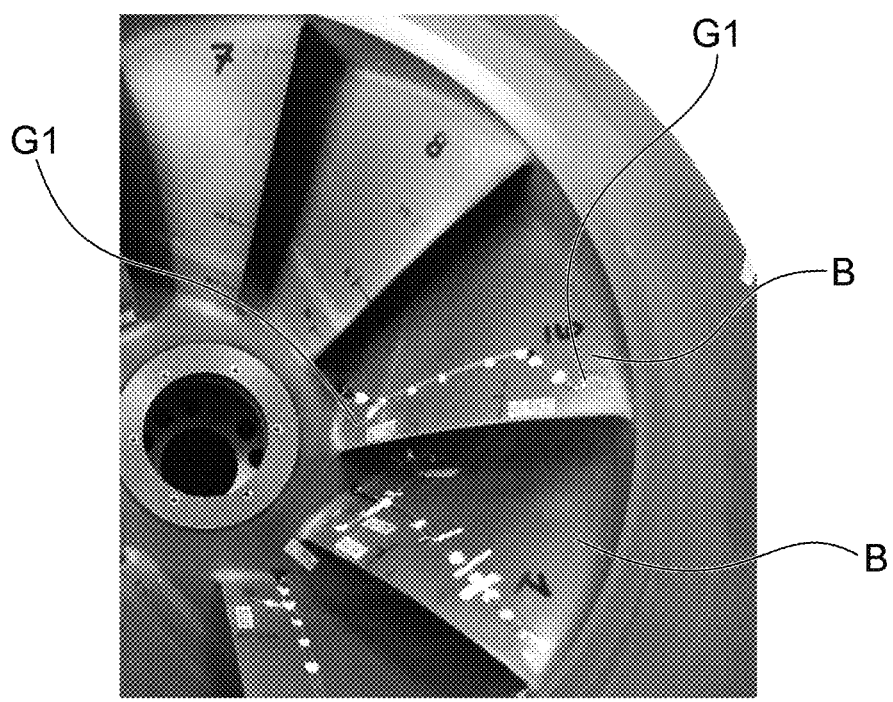
FIG. 2 is a photograph representing strain gauges installed on the suction side of a blade of a runner.
Figure 3:
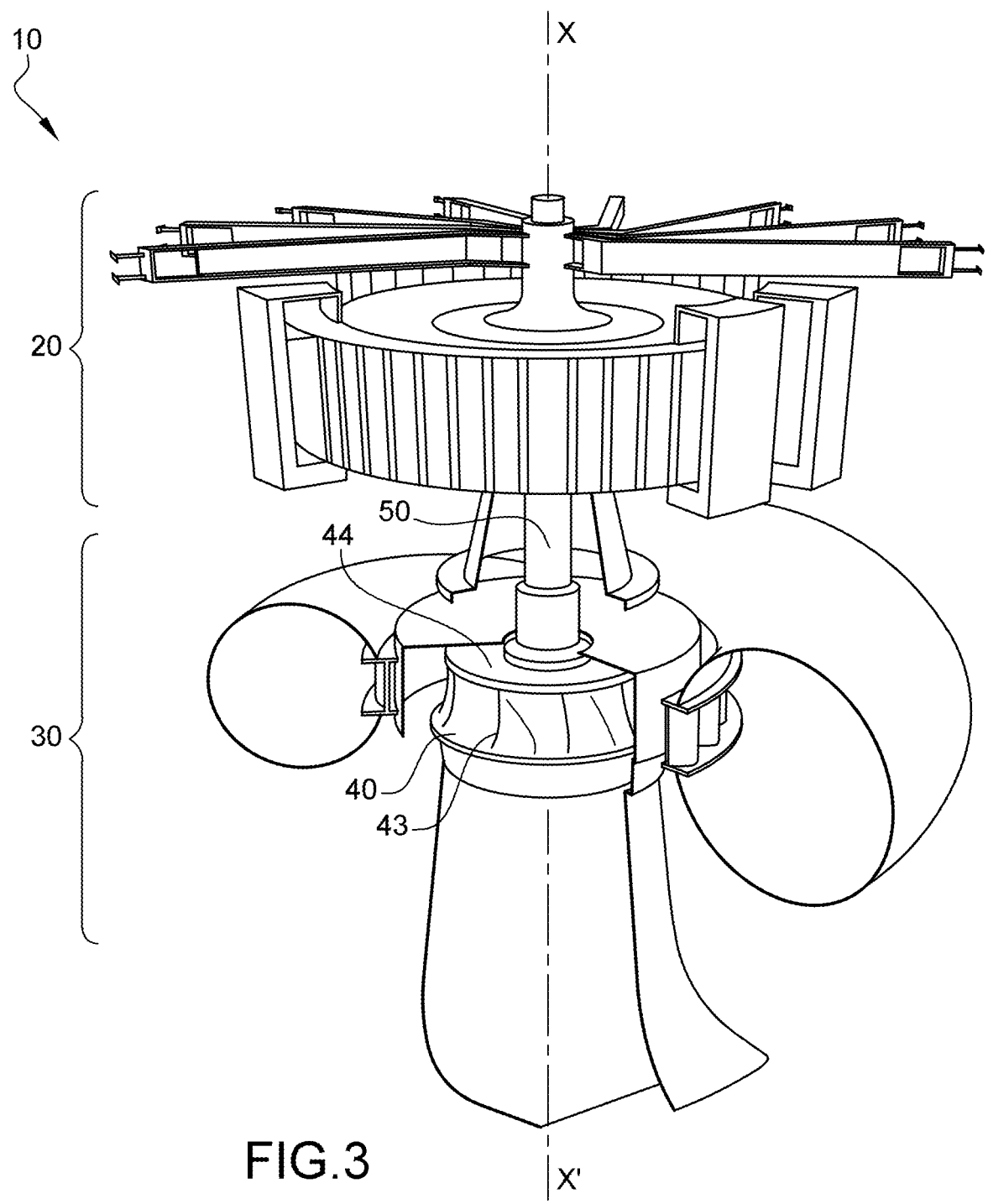
FIG. 3 represents a hydraulic unit in a perspective view, in particular, the hydraulic unit comprises a hydraulic Francis machine and a synchronous generator.

FIG. 3 depicts an overall architecture of a hydraulic unit 10 according to the present invention.

The hydraulic unit 10 comprises a generator 20 connected to a grid. The generator can comprise a synchronous generator, an asynchronous generator, a motor generator.

It is understood that, without it being necessary to specify, the generator comprises a rotor arranged to rotate inside a stator whose windings are connected to the grid.

The hydraulic unit 10 further comprises a hydraulic turbine 30 provided with a runner 40 mechanically coupled to the rotor of the synchronous generator 20 via a shaft line 50 extending along a rotation axis XX'.

While in use, the runner is driven into rotation by a stream of water flowing through the runner, and in particular flowing through a hydraulic channel.

By "hydraulic channel", it is meant a flow channel through which the stream of water exerts the forces required to trigger the rotation of the runner.

In particular, the hydraulic channel is delimited by hydraulic surfaces, said hydraulic surfaces being the surfaces against which a stream of water exerts the forces when the runner is driven in rotation by said stream of water. The hydraulic channel also comprises the pipes through which flows the stream of water.

The hydraulic channel is delimited by surfaces of the runner 40, called "hydraulic surfaces", which are directly exposed to hydraulic perturbations stemming from the flowing of the stream of water.

The runner 40 further comprises at least one sensor G, B or P on areas, called "protected areas", positioned away from the hydraulic channel.

Protected areas can be watered or dry areas. For example, the at least one sensor can be located on the vicinity of bearings supporting the shaft line 50, on valves, and even on the runner.

By "positioned away from the hydraulic channel", it is meant a sensor not exposed to and not perturbing the stream of water flowing through the hydraulic channel. In other words, the sensor is in an area, called "protected area", remote from the hydraulic surfaces.

For example, the runner is a Francis runner that comprises blades 43, each having two opposite faces said, respectively, pressure side and suction side, and extending from an external surface of a hollow hub 44.

Figure 6A:
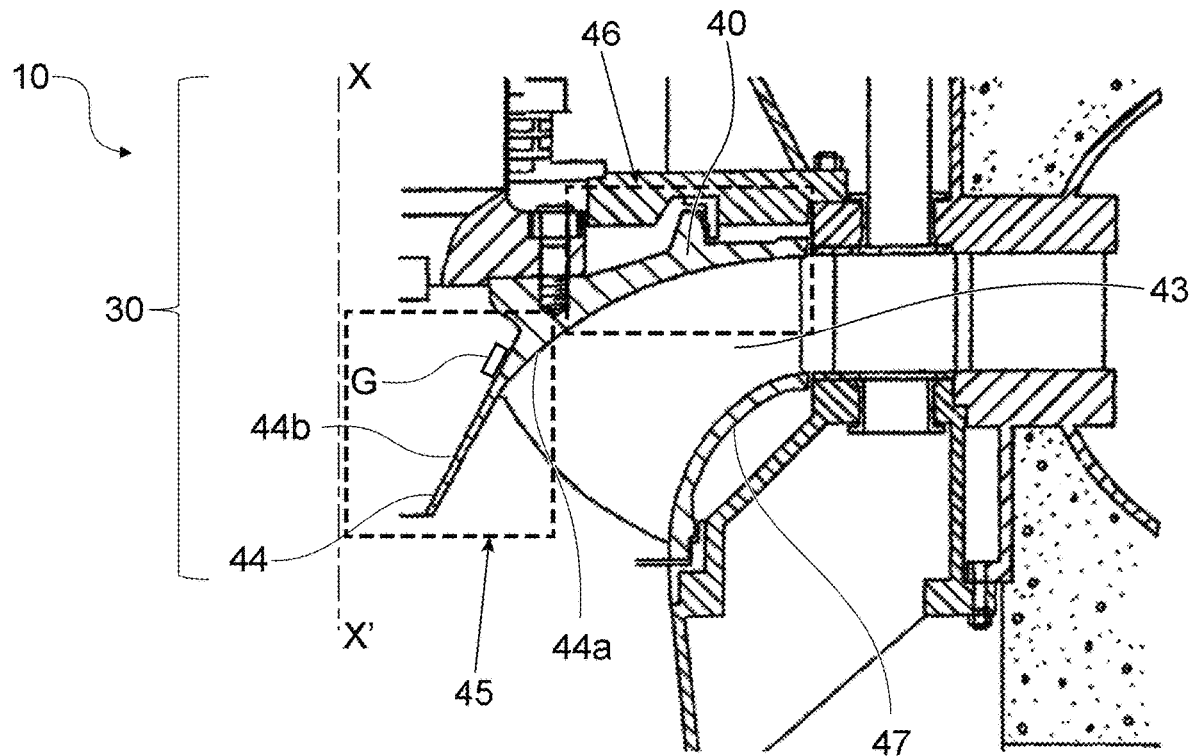
FIG. 6a is a schematic representation of the hydraulic unit of FIG. 3, according to a section plan, on which a strain gauge is installed, notably on the internal surface of the hub.

The hollow hub 44 has a diverging shape from a first face towards a second face of the runner. In particular the hollow hub comprises, from the first face towards the second face, a first section 45 having a conical shape, and a second section, said crown 46, extending essentially radially from the first section (FIG. 6a). The blades 43 can be further secured on the periphery of the runner by a peripheral shroud 47 (FIG. 6a).

By "diverging shape", it is meant a section expending from the first face toward the second face.

By "extending radially", it is meant a section that extends from the first section toward the periphery of the hollow hub.

The hub further comprises an internal surface 44b opposite to the external surface 44a.

The hydraulic channel of a runner, for example a Francis runner, is delimited by the pressure side and the suction side of the blades, and by the external surface 44a of the hollow hub 44 (FIG. 6a), and eventually by the external surface of the shroud 47.

According to this configuration, the at least one sensor can be located on an internal surface 44b of the hub 44, opposite to the external surface, so that said sensor(s) are isolated from the stream of water circulating through the hydraulic channel. For example, the sensor(s) are glued, welded or mechanically secured to the internal surface (FIG. 6a).

Figure 6B:
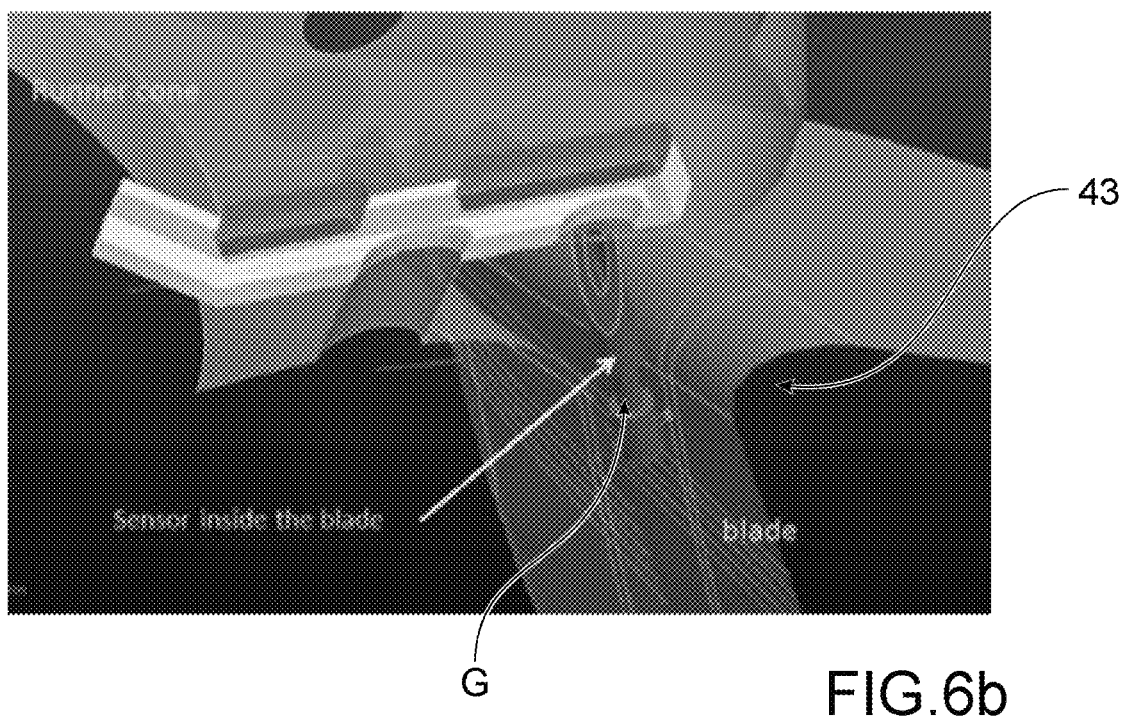
FIG. 6b is a partial schematic representation of a blade of a Francis runner which comprises a strain gauge supported by a test specimen and inserted in a cavity extending in the volume of said blade.

Alternatively, the at least one sensor can be located in cavities, each cavity extending from the internal surface towards a blade, and notably in the volume of said blade 43. In particular, the at least one sensor is secured on a test specimen inserted in the cavity (FIG. 6b).

Figure 4:
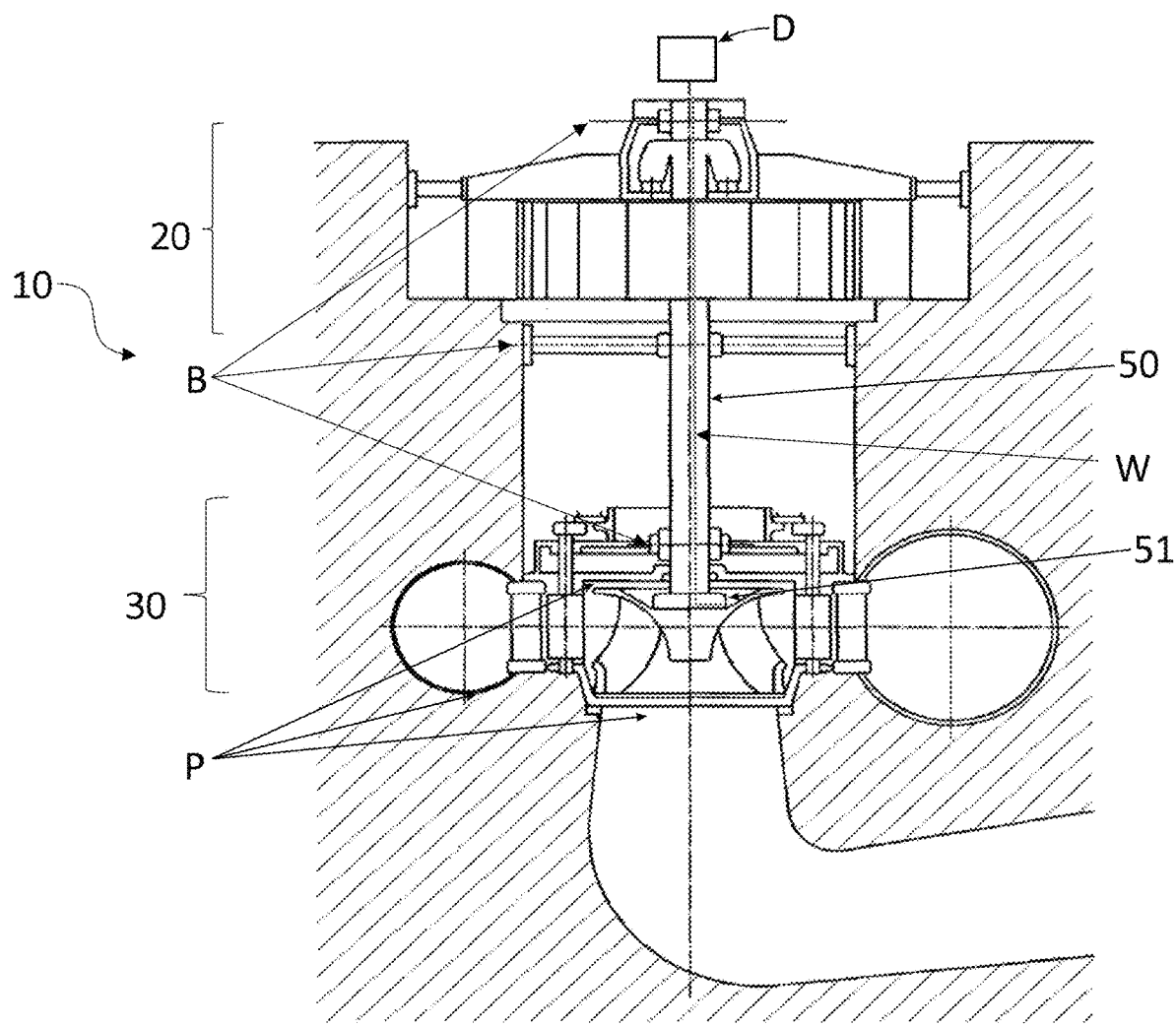
FIG. 4 is a schematic representation of a hydraulic unit of FIG. 3 according to a section plan, in particular, the FIG. 4 represents wiring and measurement means, notably measurement means for measuring parameters like torque fluctuations experienced by the shaft line, bearing vibration and shaft line displacement or hydraulic pressure pulsations.
Figure 5:
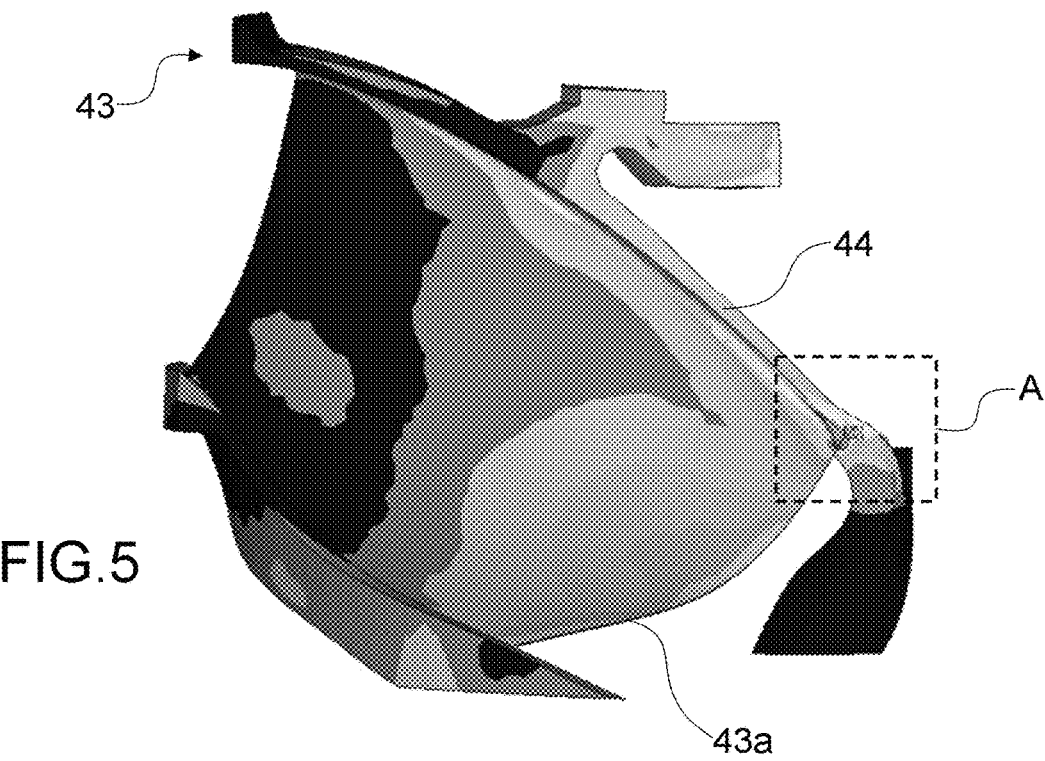
FIG. 5 is a perspective view of a blade of a Francis runner displaying, in grey levels, the magnitude of the mechanical stress undergone by said blade.

Wirings W can be provided for transferring data collected by the at least one sensor to a data acquisition system D (FIG. 4).

In particular, the wirings W can pass along the shaft line 50 of the hydraulic unit (FIG. 4).

Advantageously the wirings W are housed in a groove formed along the shaft line.

Alternatively, the shaft line 50 is a hollow shaft inside which the wiring W passes.

A coupling flange 51 (having for example a disk shape) provided at one end of the shaft line 50 can ensure the securing of said shaft line to the runner. In particular, the wirings W can pass along a groove formed on the platen for connecting the at least one sensor.

A wireless (for example via telemetry) transfer of the data collected by the at least one sensor to the data acquisition system D can also be considered.

The at least one sensor can comprise one or more of strain gauges G, torque fluctuation and bearing vibration measuring means B, and/or hydraulic pressure pulsation means P.

The torque fluctuation and bearing vibration measuring means B are advantageously probing the closest bearing to the runner, and can comprise an accelerometer that measures an acceleration, a velocity or a displacement.

A vibration sensor can also comprise a proximeter that measures a relative displacement.

The hydraulic unit can also comprise other measurement means for measuring parameters associated with operating conditions which directly affect the lifetime of the runner, and can therefore be transferred to the data acquisition system, via wirings or via a wireless connection.

By "lifetime", it is means a time before a failure occurs on the runner under specific operating conditions.

The data collected by the at least one sensor and by the other measurement means can be timestamped so that each physical quantity measurement is associated with specific operating conditions.

The method according to the present invention comprises a step a) for collecting the physical quantity measured by the at least one sensor G, B, P, while the runner is driven in rotation by the stream of water. The flowing conditions of the stream of water into the hydraulic channel are associated with operating conditions which determine the mechanical stress and mechanical strain undergone by the runner.

In particular, the inventors have demonstrated that the strain measured by the at least one sensor, in particular strain gauges, located in the protected areas depends on the mechanical strain or stress in other locations of the runner.

Notably, the strain gauges located in the protected areas can be used to probe, for example indirectly, the mechanical stress in specific locations of the hydraulic surfaces. The specific locations can correspond to "hot spots" wherein the mechanical stress corresponds to a local maximum.

In other words, a sensor, preferably a strain gauge, is located in a protected area. The runner comprises the sensor on a protected area. A physical quantity, preferably a strain, is collected in said protected area by said sensor. Said sensor measures said physical quantity in the direct environment of the sensor location. Said physical quantity is present in the direct environment of the sensor.

Based on a size of said physical quantity measured, a size of a mechanical stress in a location on the hydraulic surface is determined. Said location on the hydraulic surface is not part of the direct environment of the sensor. Said location on the hydraulic surface is situated at a distance from the direct environment of the sensor. In other words, the protected area is remote from the hydraulic surface.

A transfer function is used to determine the mechanical stress in the location on the hydraulic surface from the measurement of said physical quantity measured by the sensor. The transfer function correlates the physical quantity measured by the sensor to the mechanical stress in the location on the hydraulic surface.

For a Francis runner, the hot spots are generally observed at the corner, and in particular at the corner radius, of the blades.

The at least one sensor, and in particular the strain gauges, installed according to the present invention do not interfere with the stream of water driving into rotation the runner, so that their release is prevented.

Consequently, the at least one sensor can be permanently installed on the runner, thus allowing to strain data to be collected over long period of time and for very wide range of operating condition.

By "permanently positioned" it is meant a sensor that can be left in place after mechanical strain measurement campaigns. In particular, said sensor can be left in place over long period of time, for example over months, over years.

Dewatering/rewatering sequence are not anymore necessary for installing the at least one sensor on the runner, so that the cost associated with a strain measurement campaign is limited compared to the method known from prior art.

The method according to the present invention further comprises a step b) for determining a mechanical stress on said specific locations of the hydraulic surface, based on the operating conditions of the hydraulic turbine, and via a transfer function that correlates the strain measured in step a) and said mechanical stress on the specific locations.

According to a first variant, the transfer function can be determined by numerical simulations for a predetermined range of operating conditions of the hydraulic turbine. In this first variant, the at least one sensor comprises at least one strain gauge. However, the person skilled in the art can generalize this second variant to other sensors.

Figure 7:
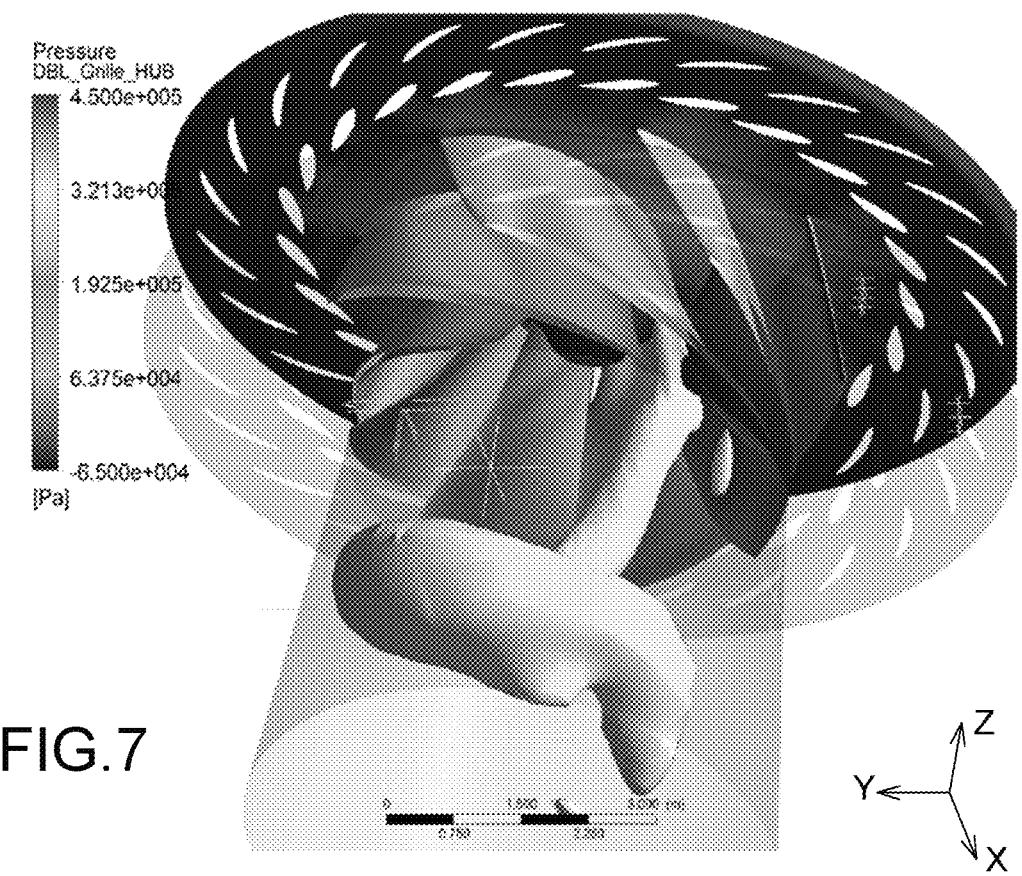
FIG. 7 is a representation of the dynamic pressure displayed, in grey levels, undergone by the blades of a runner through which a stream of water is flowing, the dynamic pressure being calculated by computational fluid dynamic analysis.

In particular, the numerical simulation involves a computational fluid dynamics ("CFD") analysis to identify the fluctuating pressure field acting on the runner, and notably on the blades. To this regard, the FIG. 7 depicts an example, in a grey scale, of the pressure field on the blades 43, and a helical vortex rope resulting from the flowing of the stream of water.

Figure 8:
FIG. 8 is a representation of the mechanical stress, in grey level, of the runner calculated by finite element analysis based on the dynamic pressure of FIG. 7.

A finite element analysis ("FEA"), based on the pressure field determined by CFD, gives the stress distribution on the runner (FIG. 8) and enables the determination of the mechanical stress on the specific location, and notably on the hot spots, from the strain measurement on the protected areas by the strain gauges.

The FEA can also be carried out on the basis known loading measurements.

The document [1] cited at the end of the description gives the necessary information and method for executing these numerical simulations.

Alternatively, according to a second variant, the transfer function can be determined during a learning period. In this second variant, the at least one sensor comprises at least one strain gauge. However, the person skilled in the art can generalize this second variant to other sensors.

Figure 9A:
FIGS. 9a and 9b are photographs representing strain gauges positioned, respectively, on a protected area and on the hydraulic surfaces of a runner.
Figure 9B:
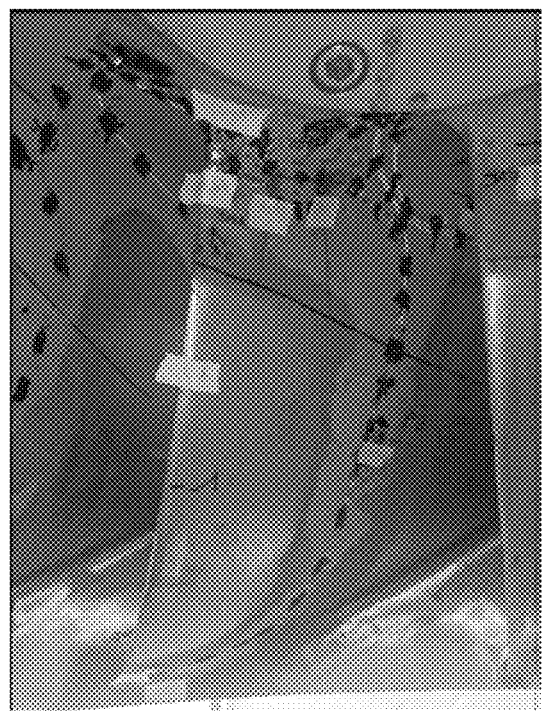

In particular, in addition to the at least one strain gauge installed on the protected areas (FIG. 9*a*), additional strain gauges are temporarily installed on the specific locations, and notably in the vicinity of the hot spots (FIG. 9*b*).

This second variant involves therefore a learning phase during which measurement collected by the strain gauges and by the additional strain gauges are correlated.

Figure 10A:
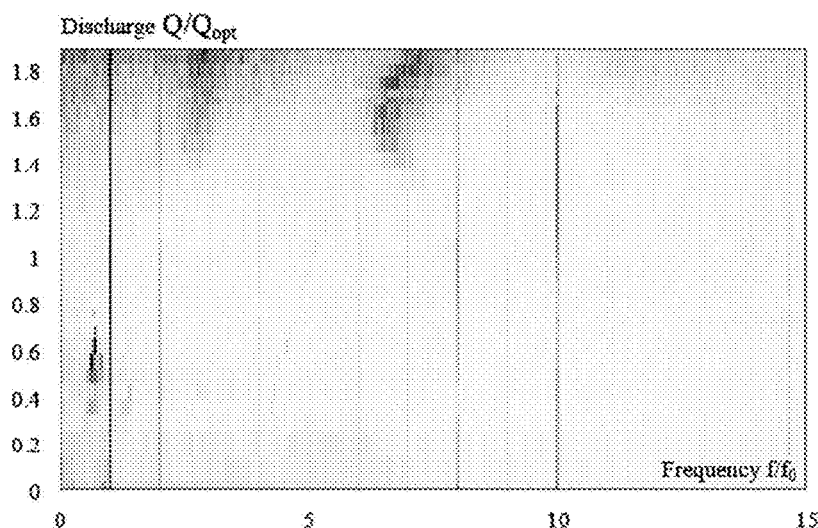
FIGS. 10a and 10b are graphical representations of the mechanical strain undergone, respectively, on the protected surfaces and the hydraulic surfaces.
Figure 10B:
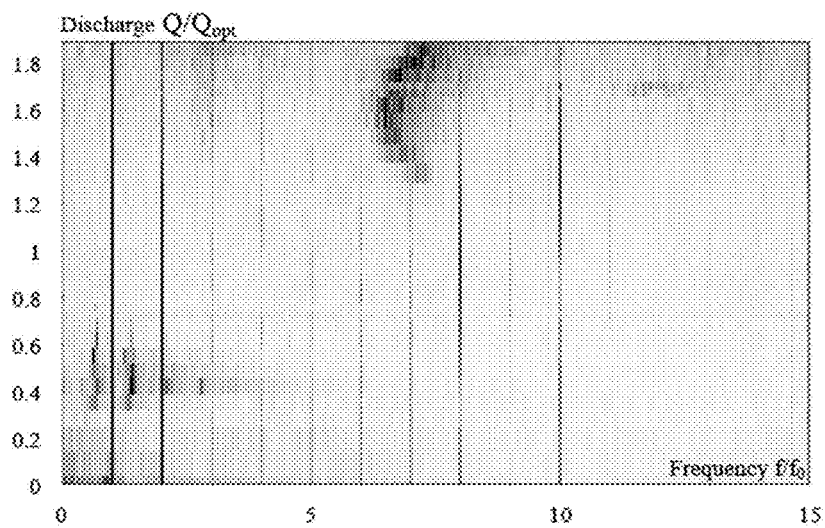

The result of this correlation is illustrated in FIGS. 10*a* and 10*b* for a given operating condition.

In particular, FIGS. 10*a* and 10*b* represent the mechanical strain undergone on a hot spot and determined with the strain measured, respectively, by the strain gauge and by the additional strain gauge. A fairly good agreement is observed between mechanical strains determined with the strain gauges and the additional strain gauges.

According to a third variant, the transfer function is determined on a reduced scale model of the considered runner.

In this third variant, the at least one sensor comprises at least one strain gauge. However, the person skilled in the art can generalize this third variant to other sensors.

The at least strain gauges is/are then positioned on the reduced scale runner, and in particular on areas corresponding to the protected areas of the runner. Additional strain gauges are also positioned on specific locations, and notably on hot spot, of the hydraulic surfaces of the reduced scale runner.

This third variant involves therefore a learning phase during which measurement of the strain gauges and of the additional strain gauges are correlated.

Figure 11:
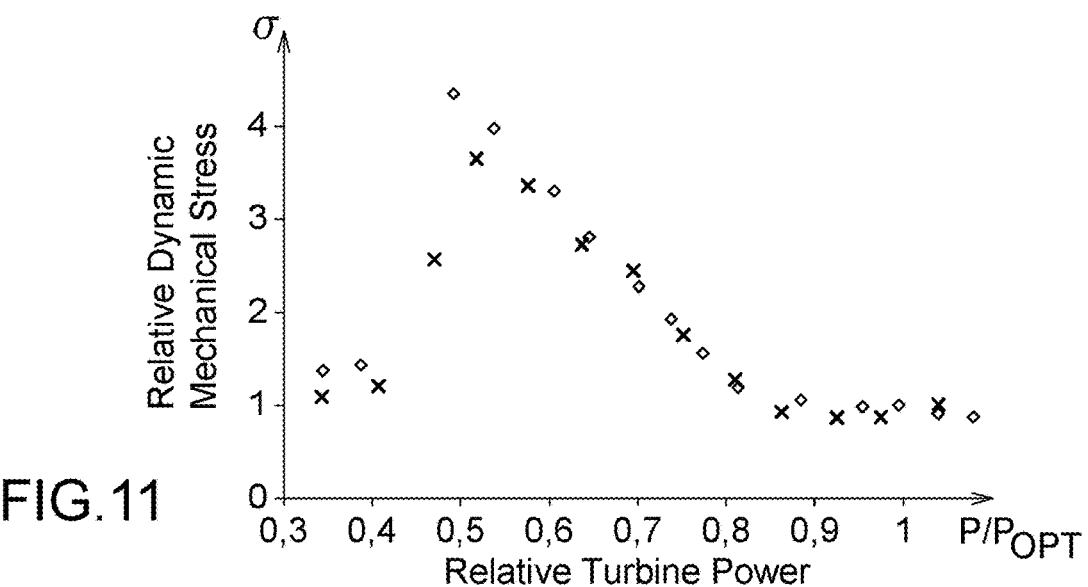
FIG. 11 is a graphical representation comparing mechanical stress undergone on the vicinity of a hot spot, respectively, of the runner and the reduced scale runner.

The FIG. 11 represent a comparison of the stress measured on specific locations of the runner with the method according to the present invention and the same specific locations on the reduces scale runner.

The invention also concerns a method for estimating a lifetime of a runner used under a specific range of operating conditions. In particular, the present invention concerns a method for estimating the lifetime of a runner based on mechanical stress determined according to the present invention.

REFERENCES

[1] Pierre-Yves LOWYS et. al., "hydro plant operating range extension transverse approach for increasing turbine flexibility", hydrovision International 2014, Track H: Technical Paper.

The invention claimed is:

1. A method for determining a mechanical stress of a runner of a hydraulic machine, wherein the runner is arranged to rotate around a rotation axis and the hydraulic machine includes a hydraulic channel delimited by hydraulic surfaces of the runner against which a stream of water exerts a force to rotationally drive the runner, the runner further having at least one sensor on a protected area positioned away from the hydraulic channel, the method comprising:
   collecting at least one physical quantity measured by the sensor;
   determining a mechanical stress on at least one specific location of the hydraulic surface via a transfer function that correlates the physical quantity measured and the mechanical stress on the at least one specific location;
   wherein the runner comprises blades each having a pressure side and an opposite suction side and extending from an external surface of a hollow hub, the pressure side and the suction side of the blades forming the hydraulic surfaces, the hollow hub further comprising an internal surface opposite to the external surface; and
   wherein the sensor is located in a cavity extending from the internal surface towards the blade, the sensor secured on a test specimen inserted in the cavity.

2. The method according to claim 1, wherein the transfer function is a mathematical model involving:
   a dynamic pressure analysis exerted by the stream of water on the runner; and
   mechanical strain analysis enabling extrapolation of a stress at the at least one specific location from the physical quantity measured by the sensor.

3. The method according to claim 1, wherein the transfer function is determined during a learning period either on the runner or on a reduced scale model of the runner.

4. The method according to claim 1, wherein the sensor is permanently positioned on the runner.

5. The method according to claim 1, wherein the at least one specific location is a hot spot location wherein the mechanical stress corresponds to a local maximum.

6. The method according to claim 1, wherein the sensor is isolated from the stream of water circulating through the hydraulic channel.

7. The method according to claim 1, wherein the collected physical quantity is transferred to a data acquisition system.

8. The method according to claim 7, wherein the collected physical quantity is transferred to the data acquisition system via wirings that pass along a shaft line of the hydraulic machine or via a wireless connection.

9. The method according to claim 7, wherein the collected physical quantity is time stamped.

10. The method according to claim 9, wherein parameters relating to the operating conditions of the hydraulic machine are time stamped and saved on the data acquisition system.

11. The method according to claim 1, wherein the physical quantity is one of the following:
    a mechanical strain and the sensor comprises a strain gauge;
    an acceleration, a velocity, or a displacement and the sensor comprises an accelerometer, a vibration sensor, or a displacement sensor;
    pressure and the sensor comprises a pressure detector; and
    a torque fluctuation of a shaft line secured to the runner, and the sensor comprises a torquemeter.

12. A method for estimating a lifetime of a runner of a hydraulic machine over a range of operating conditions, the method comprising the determination of mechanical strains of the runner over the range of operating conditions according to claim 1 and estimating the lifetime of the runner based on the mechanical strain.

* * * * *